United States Patent [19]

Gaku et al.

[11] 4,429,112

[45] Jan. 31, 1984

[54] PROCESS OF DELAYING CURE OF CURABLE RESIN COMPOSITION CONTAINING CYANATE ESTER COMPOUND WITH BENZENE SULFONIC ACID COMPOUND

[75] Inventors: Morio Gaku, Showamachi; Syunichi Nagai; Hidenori Kimpara, both of Tokyo; Satoshi Ayano, Kanagawa, all of Japan

[73] Assignee: Mitsubishi Gas Chemical Co., Inc., Tokyo, Japan

[21] Appl. No.: 383,975

[22] Filed: Jun. 1, 1982

[30] Foreign Application Priority Data

Jun. 2, 1981 [JP] Japan ................... 56-84830
Jun. 5, 1981 [JP] Japan ................... 56-86370
Jun. 5, 1981 [JP] Japan ................... 56-86371

[51] Int. Cl.$^3$ .............................................. C08G 85/00
[52] U.S. Cl. ........................ 528/422; 528/90; 528/313; 528/323; 528/408
[58] Field of Search ............... 528/422, 323, 313, 408, 528/90

[56] References Cited

U.S. PATENT DOCUMENTS 3,962,184 6/1976 Notomi et al. ................... 528/422
4,116,946 9/1978 Jakob et al. ..................... 528/422
4,195,132 3/1980 Sundermann et al. ........... 528/422

*Primary Examiner*—Harold D. Anderson
*Attorney, Agent, or Firm*—Browdy and Neimark

[57] ABSTRACT

A method for delaying curing rate of a curable resin composition comprising a polyfunctional cyanate ester compound or mixture of a polyfunctional cyanate ester compound and a polyfunctional maleimide compound, characterized in that a specific benzene sulfonic acid is added to said composition is disclosed.

7 Claims, No Drawings

PROCESS OF DELAYING CURE OF CURABLE RESIN COMPOSITION CONTAINING CYANATE ESTER COMPOUND WITH BENZENE SULFONIC ACID COMPOUND

BACKGROUND OF THE INVENTION

This invention relates to a method for delaying curing rate of a curable resin composition.

In general, when a resin composition comprising a polyfunctional cyanate ester compound selected from the group consisting of (1) a polyfunctional cyanate ester, a homoprepolymer of one or more cyanate ester of (1) and a coprepolymer of (1) and an amine (sometimes hereinunder referred to as polyfunctional cyanate ester compound), the polyfunctional cyanate ester compound and a polyfunctional maleimide compound selected from the group consisting of (1) a polyfunctional maleimide, a homoprepolymer of (1) and a coprepolymer of (1) and an amine (sometimes hereinunder referred to as polyfunctional maleimide compound) are merely heated, the composition gives rise to gelation, whereby the composition is cured. Gelation rate or curing rate of the composition is accelerated by adding a catalyst, such as a tertiary amine, an imidazole or an organic metal salt to the composition.

In order to obtain gelation rate or curing rate of a curable resin composition suitable for its use or production of cured product in the prior art, amount of catalyst added to the composition has been adjusted or a specific catalyst has been selected.

But in this method, a slight change in the amount of the catalyst, the state of its dispersion, the date of manufacture of the starting materials (i.e. polyfunctional cyanate esters and polyfunctional maleimides) or their storage period causes a substantial variation in the gelling or curing rate of the resulting resin composition that is very hard to eliminate completely.

SUMMARY OF THE INVENTION

The present inventor carried out research for delaying curing rate of a curable resin composition. As a result, it was found that an alkyl substituted or non-substituted benzene sulfonic acid, such as benzene sulfonic acid or toluene sulfonic acid is added to a curable resin composition comprising the polyfunctional cyanate ester compound or mixture of the polyfunctional cyanate ester compound and the polyfunctional maleimide compound, gelation rate or curing rate of the composition can advantageously be delayed.

An object of this invention is to provide a method for delaying curing rate of a curable resin composition comprising a polyfunctional cyanate ester compound, or mixture of a polyfunctional cyanate ester compound and a polyfunctional maleimide compound having excellent storage stability.

Another object of this invention is to provide a curable resin composition, curing rate of which can easily be adjusted by adding a certain catalyst to the composition.

This invention relates to a method for delaying curing rate of a curable resin composition comprising:
(a) at least one cyanate ester compound selected from the group consisting of
(1) a polyfunctional aromatic cyanate ester monomer having the formula $R\text{—(OCN)}_m$ wherein m is 2 to 5 and R is an aromatic organic group, the cyanate groups being bonded to an aromatic ring of said aromatic organic group,
(2) a homoprepolymer of one or more cyanate esters of (1),
(3) a coprepolymer of (1) and an amine, characterized in that
at least one alkyl substituted or non-substituted benzene sulfonic acid represented by the formula

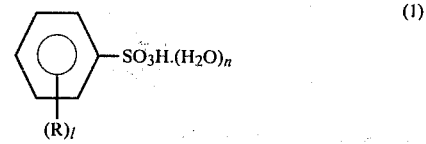

wherein R is alkyl having 1–3 carbon atoms, l is 0 or integer of 1–3 and n is 0 or integer of 1–4 in an amount of 0.0001–5% by weight on the basis of total weight of the composition is added to said composition.

This invention also relates to a method for delaying curing rate of a curable resin composition comprising:
(a) at least one cyanate ester compound selected from the group consisting of
(1) a polyfunctional aromatic cyanate ester monomer having the formula $R\text{—(OCN)}_m$ wherein m is 2 to 5 and R is an aromatic organic group, the cyanate groups being bonded to an aromatic ring of said aromatic organic group,
(2) a homoprepolymer of one or more cyanate esters of (1),
(3) a coprepolymer of (1) and an amine;
(b) at least one compound selected from the group consisting of:
(1) a polyfunctional maleimide,
(2) a homoprepolymer of (1); and
(3) a coprepolymer of (1) and an amine,
said composition including a mixture of components (a) and (b), a preliminary reaction product of components (a) and (b), or the combination of said mixture and said preliminary reaction product, characterized in that at least one alkyl substituted or non-substituted benzene sulfonic acid represented by the formula

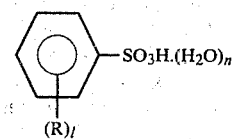

wherein R is alkyl having 1–3 carbon atoms, l is 0 or integer of 1–3 and n is 0 or integer of 1–4 in an amount of 0.0001–5% by weight on the basis of total weight of the composition is added to said composition.

DETAILED DESCRIPTION OF THE INVENTION

By polyfunctional cyanate ester is meant a compound having at least two cyanate groups in its molecule. The polyfunctional cyanate ester is represented by the formula

wherein R is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

wherein $R^1$ and $R^2$ are the same or different and each represents a hydrogen atom or an alkyl group containing 1 to 4 carbon atoms, —O—, —CH$_2$OCH$_2$—, —S—,

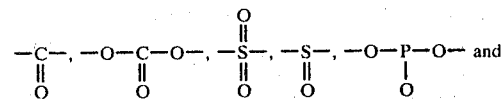

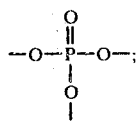

said aromatic nucleus is optionally substituted by a substituent selected from the group consisting of alkyl groups containing 1 to 4 carbon atoms, alkoxy groups, containing 1 to 4 carbon atoms, chlorine and bromine; m is an integer of 2 to 5, and the cyanate group is always directly bonded to the aromatic nucleus.

Examples of the polyfunctional cyanate ester include dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl) methane; 2,2-bis(4-cyanatophenyl)propane, 2,2-bis(3,5-dichloro-4-cyanatophenyl)propane, 2,2-bis(3,5-dibromo-4-dicyanatophenyl)propane; bis(4-cyanatophenyl)ether; bis(4-cyanatophenyl)thioether; bis(4-cyanatophenyl)sulfone; tris-(4-cyanatophenyl)phosphite; tris(4-cyanatophenyl)phosphate; bis(3-chloro-4-cyanatophenyl)methane; cyanated novolak derived from novolak; cyanated bisphenol type polycarbonate oligomer derived from bisphenol type polycarbonate oligomer and mixture thereof. Other cyanate esters employed in the practice of this invention are given in U.S. Pat. Nos. 3,553,244; 3,740,348; 3,755,402; 3,448,079 and 3,562,214, British Pat. No. 1,060,933 and Japanese Patent Publication (Kokai) No. 63149/1976 which are incorporated herein by reference.

The above mentioned cyanate esters may be used as mixtures.

Prepolymers may be used containing a sym-triazine ring which is prepared by the trimerization of the cyanate groups of the cyanate ester, and which have an number average molecular weight from 400 to 6,000. Such prepolymers can be prepared by polymerizing the above cyanate esters in the presence of, as a catalyst, an acid such as a mineral acid or Lewis acid, a base such as sodium hydroxide, a sodium alcoholate or a tertiary amine, a salt such as sodium carbonate or lithium chloride, or phosphate ester.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention.

A coprepolymer of the cyanate ester and an amine may be used as the cyanate ester component. Examples of the amines include meta- or para-phenylenediamine, meta- or para-xylylenediamine, 1,4- or 1,3-cyclohexanediamine, hexahydroxylylenediamine, 4,4'-diaminobiphenyl, bis(4-aminophenyl)methane, bis(4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl)cyclohexane, 2,2-bis(4-aminophenyl)propane, 2,2-bis(4-amino-3-methylphenyl)propane, 2,2-bis(3,5-dibromo-4-aminophenyl)propane, bis(4-aminophenyl)phenylmethane, 3,4-diaminophenyl-4'-aminophenylmethane and 1,1-bis(4-aminophenyl)-1-phenylethane.

A mixture of prepolymer of the cyanate ester and coprepolymer of the cyanate ester and an amine may be used as mixture.

The polyfunctional maleimides employed in the present invention are organic compounds having two or more maleimide groups derived from maleic anhydride and a polyamine and are represented by the following general formula

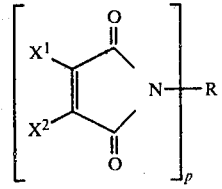

wherein R represents divalent to pentavalent aromatic or alicyclic organic group, each of $X^1$ and $X^2$ represents a hydrogen atom, halogen atom or alkyl group, and p represents an integer of 2-5.

The maleimides represented by the above formula can be produced by a method known per se which involves reacting maleic anhydride with polyamine to form a maleamide acid, and then dehydro-cyclizing the maleamide acid. Examples of polyfunctional maleimide include 1,3- or 1,4-dimaleimido benzene, 1,3- or 1,4-bis(-maleimido methylene)benzene, 1,3- or 1,4-dimaleimido cyclohexane, 1,3- or 1,4-bis(maleimidomethylene)cyclohexane 4,4'-dimaleimido biphenyl, bis(4-maleimidophenyl)methane, bis(4-maleimidophenyl)ether, bis(4-maleimidophenyl)sulfone, bis(4-maleimido-3-methylphenyl)methane, bis(4-maleimido-3-chlorophenyl)methane, bis(4-maleimido-3,5-dimethylphenyl)methane, 2,2-bis(4-maleimido-3-methylphenyl)propane, 2,2-bis(4-maleimido-3,5-dibromophenyl)propane, bis(4-maleimidophenyl)phenylmethane, 3,4-dimaleimidophenyl-4'-maleimidophenylmethane, 1,1-bis(4-maleimidophenyl)-1-phenylmethane, and maleimides derived from melamine and addition product of formalin and an aniline in which benzene rings of two or more aniline bond through methylene group.

Aromatic amines are preferable as the starting polyamines. The reason is that the resulting object resin has excellent properties, such as heat-resistance, etc. When the resulting object resins have desirable flexibility and pliability, alicyclic amine alone or combination of the alicyclic amines and other amines may be used. Though secondary amines can be used as the starting amine, the primary amines are preferable.

Amines employed in reaction with cyanate esters for preparing coprepolymers of the cyanate ester and the amine may be profitably used as an amine component for preparing maleimides. In addition to the above-mentioned amines, melamine having s-triazine ring and polyamines obtained by reaction aniline with formaldehyde, in which two or more benzene rings are bonded through methylene bond, may also be used.

The functional maleimides as mentioned above may be used alone or as a mixture. Also the prepolymer of the maleimide obtained by heating the maleimide in the presence or absence of a catalyst may be used. In addition, coprepolymers of the maleimide and the amine employed for synthesizing the polyfunctional maleimide may be used.

The curable resin composition may contain an epoxy compound. By "epoxy compound" is meant compounds having two or more epoxy groups in its molecule, or prepolymers thereof.

Examples of the epoxy compounds include polyglycidyl compounds obtained by reacting an epihalohydrin with a polyol, a polyhydroxybenzene, bisphenol, novolak base phenol resin having low molecular weight, hydroxy group-containing silicone resin, aniline or 3,5-diaminophenol; and polyepoxy compounds obtained by epoxidizing double bond of butadiene, pentadiene, vinyl cyclohexane, dicyclopentyl ether and the like.

The alkyl substituted or non-substituted benzene sulfonic acids include benzene sulfonic acid, para-toluene sulfonic acid, etc. The acids may be used in an anhydrous form or acids having water of hydration may also be used. The amount of the alkyl substituted or non-substituted benzene sulfonic acid used may be in the range of 0.0001-5% by weight, preferably 0.001-1% by weight on the basis of total weight of the curable resin composition. Use of the sulfonic acid in amount of less than 0.0001% by weight has less effect of delaying curing rate of the composition. The use of the sulfonic acid in amount of more than 5% by weight does not give rise to much better effect of delaying the curing rate of the composition. The use of the sulfonic acid in amount of more than 5% by weight rather impairs material balance.

The methods for incorporating the sulfonic acid into the curable resin composition are in the following: When the curable resin composition is used as a varnish, the sulfonic acid dissolved in a solvent, such as acetone, methyl ethyl ketone, toluene, xylene, etc., or solid sulfonic acid may be added to the resin composition. When the curable resin composition is used without any solvent, the solid sulfonic acid may conventionally be added to melt resin composition.

When the curable resin composition of this invention comprises (a) the polyfunctional cyanate ester compound and (b) the polyfunctional maleimide compound, the resin composition including a mixture of components (a) and (b), a preliminary reaction product of components (a) and (b), or the combination of said mixture and said preliminary reaction product is within the scope of this invention.

The curable composition of this invention may be reticulated by heating it alone to form a cured resin having heat resistance. In general, a catalyst may be used in order to promote crosslinking reaction of the components in the composition.

Examples of the catalysts include imidazoles, such as 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N-dimethyltoluidine, N,N-dimethyl-p-anisidine, p-halogene-N,N-dimethylaniline, 2-N-ethylanilino ethanol, tri-n-butylamine, pyridine, quinoline, N-methylvorpholine, triethanolamine, triethylenediamine, N,N,N',N'-tetramethylbutanediamine, N-methylpiperidine; phenols, such as phenol, cresol, xylenol, resorcine, and phloroglusin; organic metal salts, such as lead naphthanate, lead stearate, zinc naphthanate, zinc octoate, tin oleate, dibutyl tin maleate, manganese naphthenate, cobalt naphthenate, and acetyl acetone iron; and inorganic metal salts, such as stannic chloride, zinc chloride and aluminum chloride; peroxides, such as benzoyl peroxide, lauroyl peroxide, octanoyl peroxide, acetyl peroxide, para-chlorobenzoyl peroxide and di-t-butyl diperphthalate; acid anhydrides, such as maleic anhydride, phthalic anhydride, lauric anhydride, pyromellitic anhydride, trimellitic anhydride, hexahydrophthalic anhydride, hexahydropyromellitic anhydride and hexahydrotrimellitic anhydride; azo compounds, such as azoisobutylonitrile, 2-2'-azobispropane, m,m'-azoxystyrene, hydrozones, and mixtures thereof.

In addition to the above-mentioned catalyst, a curing agent for epoxy resin and a curing catalyst for epoxy resin may be used as a catalyst of this invention.

The amount of the catalyst employed may be less than 5% by weight of the total composition.

A variety of additives may be added to the curable composition to impart specific properties provided that they do not impair the essential properties of the resulting resin. Examples of the additives include natural or synthetic resins, fibrous reinforcement, fillers, pigments, dyestuffs, thickening agents, lubricants, flame-retardants and the like.

The curable compositions of this invention are present in a wide range of forms from liquid to solid at room temperature, depending on the nature of the components constituting the composition, and the preliminary reaction conditions. Solid curable composition, liquid curable composition or solution of the composition in solvent may be used according to the use purpose.

The curable resin composition of this invention has excellent storage stability.

According to the present invention, the gelation rate or curing rate of the resin composition can be adjusted to great extent, and variation between lots of the compositions decreases greatly.

The present invention is furhter illustrated by the following non-limiting Examples and Controls.

Percent and parts are by weight, unless otherwise specified.

EXAMPLE 1

600 Gram (g) of 2,2-bis(4-cyanatophenyl)propane and 400 g of bis(4-maleimidophenyl)methane were preliminarily reacted to form prepolymer. 1 G of p-toluene sulfonic acid monohydrate and 333 g of methyl ethyl ketone were added to the prepolymer to form colloidal solution of the resin.

0.1 G of zinc octoate (zinc content 18%) was added to 133 g of the resulting resin solution with stirring. The resulting mixture was uniformly blended. The resin solution was coated on a heating plate. The time required for gelation of the resin at 160° C. was measured. Gelation time was 8 minutes and 50 seconds.

Comparative Run 1

The procedure of Example 1 was repeated except that p-toluene sulfonic acid monohydrate was not used. The gelation time of the resin solution was 4 minutes and 35 seconds.

EXAMPLE 2

600 G of 2,2-bis(4-cyanatophenyl)propane, 300 g of novolak base cyanate ester derived from phenol novolak resin having number average molecular weight of 300 (MP-1210 Gunei Chemical Co., Ltd.) and 100 g of bis(4-maleimidophenyl) methane were preliminarily reacted at 150° C. to form prepolymer. To the prepolymer were added 0.5 g of benzene sulfonic acid, 467 g of methyl ethyl ketone and 200 g of dimethyl formamide.

After 0.1 g of zinc octoate (zinc content: 18%) was added to the resulting resin solution. The gelation time was measured. Gelation time was 3 minutes and 44 seconds.

Comparative Run 2

The procedure of Example 2 was repeated except that benzene sulfonic acid was not used. Gelation time of the resulting resin solution was 1 minute and 23 seconds.

EXAMPLE 3

600 G of 2,2-bis(4-cyanatophenyl)propane, 400 g of bis(4-maleimidophenyl)methane and 3 g of p-toluene sulfonic acid monohydrate were blended at 130° C. The resulting blend was cooled to obtain resin composition.

After the resulting resin composition was melted by heating it and was stirred at 120° C. for 8 hours, viscosity of the composition was measured. The viscosity was 85 centi poise (cps)/120° C.

Comparative Run 3

The procedure of Example 3 was repeated except that p-toluene sulfonic acid monohydrate was not used. The viscosity of the composition was 1500 cps/120° C.

EXAMPLES 4 AND 5

The procedure of Example 1 was repeated except that amounts of p-toluene sulfonic acid monohydrate were 10 g (Ex. 4) and 0.1 g (Ex. 5). Gelation times of the composition were 10 minutes (Ex. 4) and 5 minutes and 2 seconds (Ex. 5).

EXAMPLE 6

600 G of 2,2-bis(4-cyanatophenyl)propane and 400 g of bis(4-maleimidophenyl)methane were preliminarily reacted. After the reaction was continued at 140° C. to such an extent that viscosity of the resulting composition amounted to 4.0 poise/125° C., 333 g of methyl ethyl ketone was added to the reaction product to obtain a colloidal solution.

Two other resin solutions were prepared on different dates from different lots of starting materials having the same composition.

To each of the resin solutions (133 g) was added p-toluene sulfonic acid in amount given in Table 1 and 0.1 g of zinc octoate (zinc content: 18%). These resin solutions were stirred. Gelation time of each of the resin solutions was measured on a heating plate maintained at 160° C. The results are shown in Table 1.

Comparative Run 4

The procedures of Example 6 were repeated except that p-toluene solfonic acid was not used. The results are shown in Table 1.

TABLE 1

|  | lot No. of resin composition | amount of p-toluene sulfonic acid monohydrate added | gelation time |
|---|---|---|---|
| Example 6 | No. 1 | 0.092 g | 8 min. and 2 sec. |
|  | No. 2 | 0.080 g | 7 min. and 56 sec. |
|  | No. 3 | 0.070 g | 8 min. and 5 sec. |
| Comparative Run 4 | No. 1 | 0 | 3 min. and 55 sec. |
|  | No. 2 | 0 | 4 min. and 24 sec. |
|  | No. 3 | 0 | 4 min. and 52 sec. |

EXAMPLE 7

720 G of 2,2-bis(4-cyanatophenyl)propane, 80 g of bis(4-maleimidophenyl)methane and 200 g of bisphenol A base epoxy resin (Epikote 828 produced by Shell Oil Co.) were preliminarily reacted at 135° C. for 2 hours to form prepolymer. 1 G of p-toluene sulfonic acid monohydrate and 667 g of methyl ethyl ketone were added to the prepolymer to form the resin solution.

0.1 G of zinc octoate (zinc content: 18%) was added to 167 g of the resulting resin solution with stirring. The resulting mixture was uniformly blended. The resin solution was coated on a heating plate. The time required for gelation of the resin at 160° C. was measured. Gelation time was 3 minutes and 31 seconds.

Comparative Run 5

The procedure of Example 7 was repeated except that p-toluene sulfonic acid monohydrate was not used. The gelation time of the resin solution was 1 minute and 12 seconds.

EXAMPLE 8

260 G of 2,2-bis(4-cyanatophenyl)propane, 100 g of novolak base cyanate ester derived from phenol novolak resin having number average molecular weight of 330 (MP-1210 Gunei Chemical Co., Ltd.) and 240 g of bis(4-maleimidophenyl)methane were preliminarily reacted at 150° C. for 3 hours to form prepolymer. To the prepolymer were added 400 g of novolak-base epoxy resin (DEN438 produced by Daw Chemical Co.), 2 g of benzene sulfonic acid and 428 g of methyl ethyl ketone to form a resin solution.

After 0.1 g of zinc octoate (zinc content: 18%) was added to 143 g of the resulting resin solution. The gelation time was measured. Gelation time was 4 minutes and 52 seconds.

Comparative Run 6

The procedure of Example 8 was repeated except that benzene sulfonic acid was not used. Gelation time of the resulting resin solution was 1 minute and 19 seconds.

EXAMPLE 9

560 G of 2,2-bis(4-cyanatophenyl)propane, 240 g of bis(4-maleimidophenyl)methane, 200 g of bisphenol F base epoxy resin (Epikote 807 produced by Shell Oil Co.) and 10 g of p-toluene sulfonic acid monohydrate were blended at 120° C. and immediately cooled to obtain resin composition.

After the resulting resin composition was melted by heating it and was stirred at 100° C. for 8 hours, viscosity of the composition was measured. The viscosity was 48 cps/100° C.

Comparative Run 7

The procedure of Example 9 was repeated except that p-toluene sulfonic acid monohydrate was not used. The viscosity of the composition was 410 cps/100° C.

EXAMPLE 10

The procedure of Example 7 was repeated except that amount of p-toluene sulfonic acid monohydrate was 0.1 g. Gelation time of the composition was 1 minute and 34 seconds.

EXAMPLE 11

720 G of 2,2-bis(4-cyanatophenyl)propane, 80 g of bis(4-maleimidophenyl)methane and 200 g of bisphenol A-base epoxy resin (Epikote 828 produced by Shell Oil Co.) were preliminarily reacted. After the reaction was continued at 135° C. to such an extent that refractive index at 90° C. ($n_D^{90}$) amounted to 1.575, 667 g of methyl ethyl ketone was added to the reaction product to obtain a resin solution.

Two other resin solutions were prepared on different dates from different lots of starting materials having the same composition.

To each of different lots of the resin solutions (167 g) were added p-toluene sulfonic acid monohydrate in amounts given in Table 2 and 0.1 g of zinc octoate (zinc content: 18%). These resin solutions were stirred. Gelation time of each of the resin solutions was measured on a heating plate maintained at 160° C. The results are shown in Table 2.

Comparative Run 8

The procedures of Example 11 were repeated except that p-toluene sulfonic acid monohydrate was not used. The results are shown in Table 2.

TABLE 2

| | lots of resin solutions | amount of p-toluene sulfonic acid monohydrate added | gelation time |
|---|---|---|---|
| Example 11 | No. 1 | 0.120 g | 3 min. and 33 sec. |
| | No. 2 | 0.084 g | 3 min. and 27 sec. |
| | No. 3 | 0.102 g | 3 min. and 29 sec. |
| Comparative Run 8 | No. 1 | 0 | 51 sec. |
| | No. 2 | 0 | 1 min. and 29 sec. |
| | No. 3 | 0 | 1 min. and 8 sec. |

EXAMPLE 12

1000 G of 2,2-bis(4-cyanatophenyl)propane was preliminarily polymerized at 150° C. for 8 hours to form prepolymer. To the resulting prepolymer were added 0.5 g of p-toluene sulfonic acid monohydrate and 428 g of methyl ethyl ketone, thereby forming resin solution. 0.1 G of zinc octoate (zinc content: 18%) was added to the solution, and the mixture was stirred. Gelation time of the solution was measured on a plate maintained at 160° C. Gelation time was 4 minutes and 25 seconds.

Comparative Run 9

The procedure of Example 12 was repeated except that p-toluene sulfonic acid monohydrate was not used. Gelation time of the resulting solution was 1 minute and 15 seconds.

EXAMPLE 13

1000 G of 2,2-bis(4-cyanatophenyl)propane was melted at 100° C., and 1 g of benzene sulfonic acid was added to the compound. The mixture was stirred at 100° C. for 24 hours. Viscosity of the composition was 18 cps/100° C.

Comparative Run 10

The procedure of Example 13 was repeated except that benzene sulfonic acid was not used. The viscosity of the resulting composition was 45 cps/100° C.

EXAMPLE 14

10 G of p-toluene sulfonic acid monohydrate and 428 g of methyl ethyl ketone were added to 1000 g of novolak-base cyanate ester derived from phenol novolak resin having number average molecular weight of 330 (MP-1210 produced by Gunei Chemical Co.) to form resin solution. After 0.1 g of zinc octoate (zinc content: 18%) was added to 143 g of the resulting resin solution, gelation time of the solution was measured on a plate maintained at 160° C. Gelation time of the solution was more than 10 minutes.

Comparative Run 11

The procedure of Example 14 was repeated except that p-toluene sulfonic acid monohydrate was not used. Gelation of the resulting solution was 1 minute and 2 seconds.

EXAMPLE 15

The procedure of Example 12 was repeated except that amount of p-toluene sulfonic acid monohydrate used was 0.1 g. Gelation time was 1 minute and 52 seconds.

EXAMPLE 16

Three lots of 2,2-bis(4-cyanatophenyl)propane (1000 g) prepared on different dates were preliminarily polymerized. After the polymerization was continued at 150° C. to such an extent that refractive index ($n_D^{90}$) amounted to 1.577, 428 g of methyl ethyl ketone was added to each of the prepolymers to form resin solutions.

To each of the resulting solutions (143 g) were added p-toluene sulfonic acid monohydrate in amount given in Table 3 and 0.1 g of zinc octoate (zinc content: 18%). The resulting compositions were stirred. Gelation times of the compositions were measured on a plate maintained at 160° C. The results are shown in Table 3.

Comparative Run 12

The procedure of Example 16 except that p-toluene sulfonic acid monohydrate was not used. The results are shown in Table 3.

TABLE 3

|  | lots of cyanate ester compounds | amount of p-toluene sulfonic acid monohydrate added | gelation time |
|---|---|---|---|
| Example 16 | No. 1 | 0.034 g | 3 min. and 28 sec. |
|  | No. 2 | 0.016 g | 3 min. and 31 sec. |
|  | No. 3 | 0.040 g | 3 min. and 35 sec. |
| Comparative Run 12 | No. 1 | 0 | 1 min. and 12 sec. |
|  | No. 2 | 0 | 2 min. and 23 sec. |
|  | No. 3 | 0 | 51 sec. |

What is claimed is:

1. A method for delaying curing rate of a curable resin composition comprising:
   (a) at least one cyanate ester compound selected from the group consisting of
      (1) a polyfunctional aromatic cyanate ester monomer having the formula R―(OCN)$_m$ wherein m is 2 to 5 and R is an aromatic organic group, the cyanate groups being bonded to an aromatic ring of said aromatic organic group,
      (2) a homoprepolymer of one or more cyanate esters of (1),
      (3) a coprepolymer of (1) and an amine, characterized in that
   at least one alkyl substituted or non-substituted benzene sulfonic acid represented by the formula

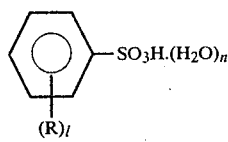

(1)

wherein R is alkyl having 1–3 carbon atoms, l is 0 or integer of 1–3 and n is 0 or integer of 1–4 in an amount of 0.0001–5% by weight on the basis of total weight of the composition is added to said composition.

2. The method as defined in claim 1 wherein the cyanate ester is selected from the group consisting of 1,3- or 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatopheny)methane; 2,2-bis(4-cyanatophenyl)propane, 2,2-bis(3,5-dichloro-4-cyanatophenyl)propane, 2,2-bis(3-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak produced by reacting a novolak with cyanogen halide, cyanated bisphenol polycarbonate oligomer produced by reacting a bisphenol polycarbonate oligomer with cyanogen halide; and mixtures thereof.

3. The method as defined in claim 1 wherein said benzene sulfonic acid is selected from the group consisting of benzene sulfonic acid, toluene sulfonic acid and toluene sulfonic acid monohydrate.

4. A method for delaying curing rate of a curable resin composition comprising:
   (a) at least one cyanate ester compound selected from the group consisting of
      (1) a polyfunctional aromatic cyanate ester monomer having the formula R―(OCN)$_m$ wherein m is 2 to 5 and R is an aromatic organic group, the cyanate groups being bonded to an aromatic ring of said aromatic organic group,
      (2) a homoprepolymer of one or more cyanate esters of (1),
      (3) a coprepolymer of (1) and an amine;
   (b) at least one compound selected from the group consisting of:
      (1) a polyfunctional maleimide,
      (2) a homoprepolymer of (1), and
      (3) a coprepolymer of (1) and an amine,
   said composition including a mixture of components (a) and (b), a preliminary reaction product of components (a) and (b), or the combination of said mixture and said preliminary reaction product, characterized in that at least one alkyl substituted or non-substituted benzene sulfonic acid represented by the formula

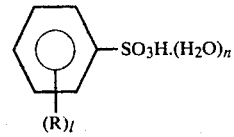

wherein R is alkyl having 1–3 carbon atoms, l is 0 or integer of 1–3 and n is 0 or integer of 1–4 in an amount of 0.0001–5% by weight on the basis of total weight of the composition is added to said composition.

5. The method as defined in claim 4 wherein the cyanate ester is selected from the group consisting of 1,3- or 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak produced by reacting a novolak with cyanogen halide, cyanated bisphenol polycarbonate oligomer produced by reacting a bisphenol polycarbonate oligomer with cyanogen halide; and mixtures thereof.

6. The method as defined in claim 4 wherein said benzene sulfonic acid is selected from the group consisting of benzene sulfonic acid, toluene sulfonic acid and toluene sulfonic acid monohydrate.

7. The method as defined in claim 4 wherein said composition further contains an epoxy compound having at least two 1,2-epoxy groups.

* * * * *